(12) United States Patent
Scaramucci et al.

(10) Patent No.: US 7,249,611 B2
(45) Date of Patent: *Jul. 31, 2007

(54) CHECK VALVE

(75) Inventors: John P. Scaramucci, Oklahoma City, OK (US); Danny Ray Lowe, Moore, OK (US)

(73) Assignee: Valve Innovations, L.L.C., Carson City, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/595,584

(22) Filed: Nov. 9, 2006

(65) Prior Publication Data

US 2007/0051411 A1    Mar. 8, 2007

Related U.S. Application Data

(63) Continuation of application No. 10/990,071, filed on Nov. 16, 2004, now Pat. No. 7,152,622.

(51) Int. Cl.
*F16K 15/03* (2006.01)

(52) U.S. Cl. .............. 137/527.2; 137/514; 137/527.4; 137/527.8; 137/904

(58) Field of Classification Search ............. 137/514, 137/527, 527.2, 527.4, 527.8, 904
See application file for complete search history.

(56) References Cited

U.S. PATENT DOCUMENTS

| 79,527 | A | * | 6/1868 | Wilson | 137/527.2 |
|---|---|---|---|---|---|
| 197,226 | A | * | 11/1877 | Rodier | 137/527.2 |
| 345,420 | A | * | 7/1886 | Eskholme | 137/527.2 |
| 556,636 | A | * | 3/1896 | Kuichling et al. | 137/527.2 |
| 2,454,072 | A | * | 11/1948 | Long | 137/527.8 |
| 2,928,416 | A | * | 3/1960 | Balhouse | 137/527.8 |
| 3,075,547 | A | * | 1/1963 | Scaramucci | 137/527.2 |
| 5,056,548 | A | * | 10/1991 | Mills | 137/527.2 |
| 5,156,183 | A | * | 10/1992 | Scaramucci | 137/454.2 |
| 5,341,840 | A | * | 8/1994 | Manson et al. | 137/527.8 |
| 7,152,622 | B2 | * | 12/2006 | Scaramucci et al. | 137/527.2 |

* cited by examiner

*Primary Examiner*—John Rivell
(74) *Attorney, Agent, or Firm*—Dunlap Codding & Rogers, P.C.

(57) ABSTRACT

A top entry check valve including a valve body with an access port. A compressible hanger body engages a portion of the valve body and is positioned in alignment with the access port of the valve body. A clapper is connected to the hanger body so that the clapper is movable between a closed position wherein the clapper engages a valve seat to occlude the passage of fluid through the fluid flow passage and an open position wherein the clapper is moved away from the valve seat to permit passage of fluid through the fluid flow passage. A closure member is connected to the valve body to close the access port of the valve body. The closure member has an abutment surface engaging the hanger body so that the hanger body is compressed between the closure member and the valve body.

20 Claims, 4 Drawing Sheets

CHECK VALVE

CROSS REFERENCE TO RELATED APPLICATIONS

This application is a continuation of U.S. application Ser. No. 10/990,071, filed Nov. 16, 2004 now U.S. Pat. No. 7,152,622, which is incorporated herein by reference in its entirety.

BACKGROUND OF THE INVENTION

1. Field of the Invention

This invention relates generally to valves and more particularly, but not by way of limitation, to a check valve particularly designed and constructed for facilitating repair and maintenance of the valve when worn or otherwise damaged.

2. Brief Description of Related Art

Check valves are old and well known for use in flow lines where it is desirable to permit fluid flow in one direction and preclude fluid flow in the opposite direction. A common structure for achieving one-way flow is by the use of a disk or clapper that is positioned so that it can pivot about an axis of a pivot shaft. The disk is loosely retained in position between a recess formed in the valve body and the lower edge of a bonnet used to close an access port.

In non-corrosive applications, such a structure generally allows for a reasonable service life. In most applications, however, in particular petroleum production, corrosive constituents generally exist within the flow media. Even when the flow media is only mildly corrosive, the combined action of the corrosion and the erosion created by vibration and the rubbing movement of the pivot shaft against the valve body and the bonnet often causes a loss of surrounding metal which may result in failure of the valve due to misalignment of the disk. One solution to this problem would be to make the entire valve from stainless steel or some other corrosion resistant material. While this would solve the corrosion problem, the cost of the valve would greatly increase and would not be economically viable.

To this end, a need exists for an improved check valve that is capable of being used in a corrosive environment yet is cost effective to manufacture and repair. It is to such an improved check valve that the present invention is directed.

BRIEF DESCRIPTION OF THE SEVERAL VIEWS OF THE DRAWINGS

FIG. 1 is a sectional view of a check valve constructed in accordance with the present invention.

DETAILED DESCRIPTION OF THE INVENTION

Figure 2:
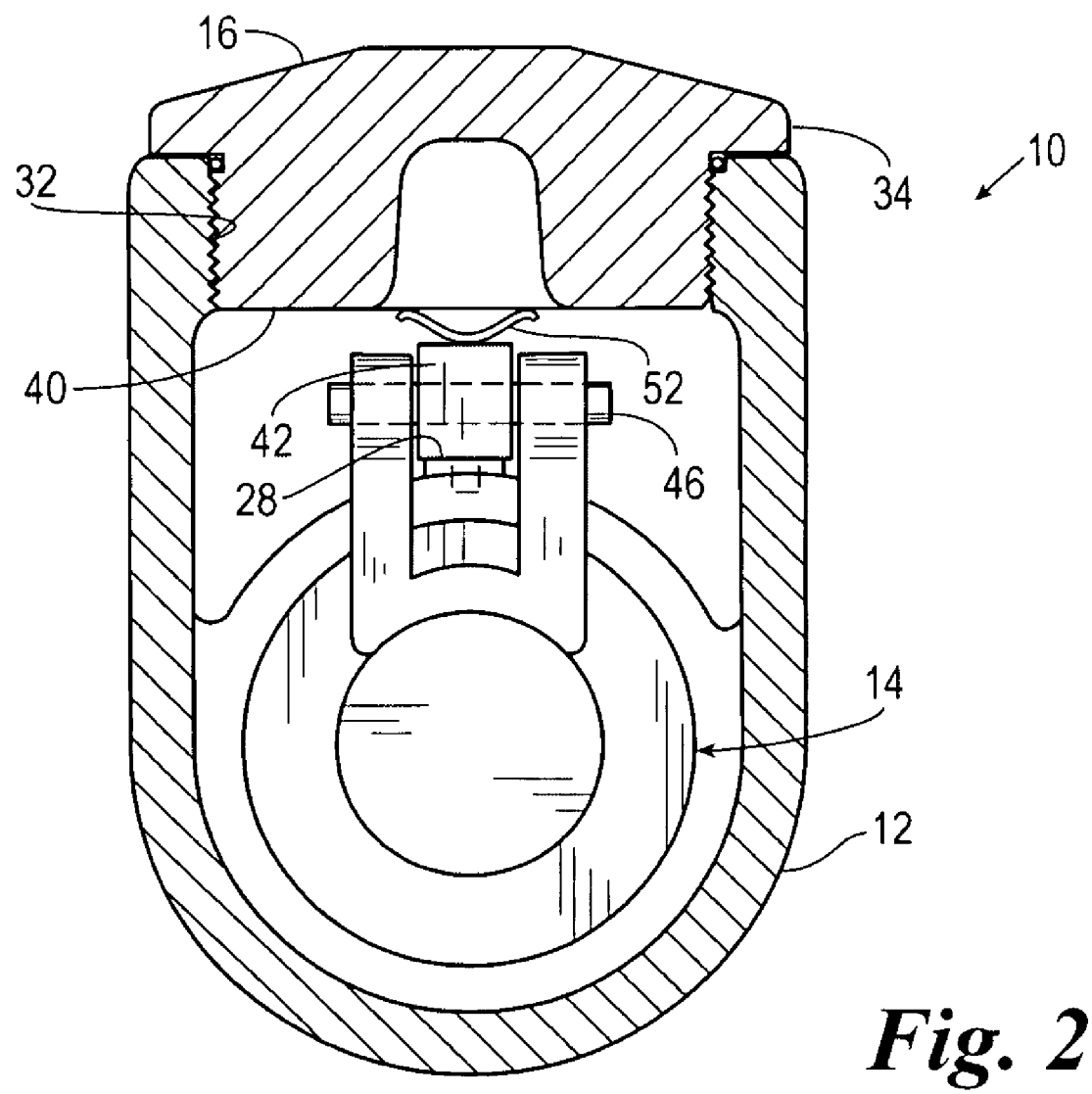
FIG. 2 is a sectional view taken along line 2-2 of FIG. 1.

Referring now to the drawings, and more particularly to FIGS. 1 and 2, a valve 10 constructed in accordance with the present invention is shown. The valve 10 includes a valve body 12, a clapper assembly 14, and a closure member 16. The clapper assembly 14 cooperates with the valve body 12 to permit fluid flow in one direction while preventing fluid flow in the opposite direction. As such, the valve 10 is of the type commonly known as a "swinging check valve."

The valve body 12 has a first end 17 with an inlet port 18 and a second end 19 with an outlet port 20 which is generally opposing the inlet port 18. The inlet port 18 extends into the valve body 12 and opens into a valve chamber 22 formed in a medial portion of the valve body 12. An annular valve seat 24 is defined about the inlet port 18. The valve seat 24 is shown to be formed as an integral part of the valve body 12. However, it will be appreciated that the valve seat 24 may be formed on a module that is inserted into the valve body 12. The outlet port 20 extends into the valve body 12 and opens into the valve chamber 22 generally opposite the inlet port 18. The inlet port 18 and outlet port 20 are shown to be internally threaded to provide a means for connecting the valve 10 into a conduit utilized for transporting a fluid. However, it will be appreciated that the inlet port 18 and the outlet port 20 may be adapted to be interposed in a flow line in other ways, such as be formed with flanges.

The first end 17 of the valve body 12 includes a shelf portion 26 which extends into the valve chamber 22 and defines a portion of the inlet port 18. The shelf portion 26 includes a generally flat bearing surface 28 for supporting the clapper assembly 14 in a manner to be discussed below. A pin receiving hole 30 is formed through the bearing surface 28 and into the shelf portion 26 along a center line of the valve body 12.

The upper portion of the valve body 12 is provided with an access port 32 which is in communication with the valve chamber 22. The access port 32 is threaded and sized to allow passage of the clapper assembly 14 to and from the valve chamber 22 via the access port 32. The shelf portion 26 of the valve body 12 projects into alignment with the access port 32 such that the bearing surface 28 faces the access port 32 and thus is accessible via the access port 32.

The closure member 16 functions to seal the access port 32 and thus has external threads to mate with threads or the access port 32. The closure member 16 further has a flange 34 for compressing a seal member 36, such as an elastomeric O-ring, disposed in a groove 38 of the valve body 12. The seal member 36 is compressed to effect a fluid tight seal between the closure member 16 and the valve body 12 when the closure member 16 is threaded onto the valve body 12 with the flange 34 engaging the valve body 12.

The closure member 16 further includes an abutment surface 40 defined by a lower end of the closure member 16. The abutment surface 40 serves to engage a portion of the clapper assembly 14 and thus cooperate with the valve body 12 to fix the clapper assembly 14 within the valve chamber 22. The size and position of the abutment surface 40 may varied so long as the abutment surface 40 engages the clapper assembly 14 when the closure member 16 is operably secured to the valve body 12 to effect a fluid tight seal. However, the abutment surface 40 is preferably annular in so far as the abutment surface 40 may slidingly engage the clapper assembly 14 as the closure member 16 is being secured to the valve body 12.

Figure 3:
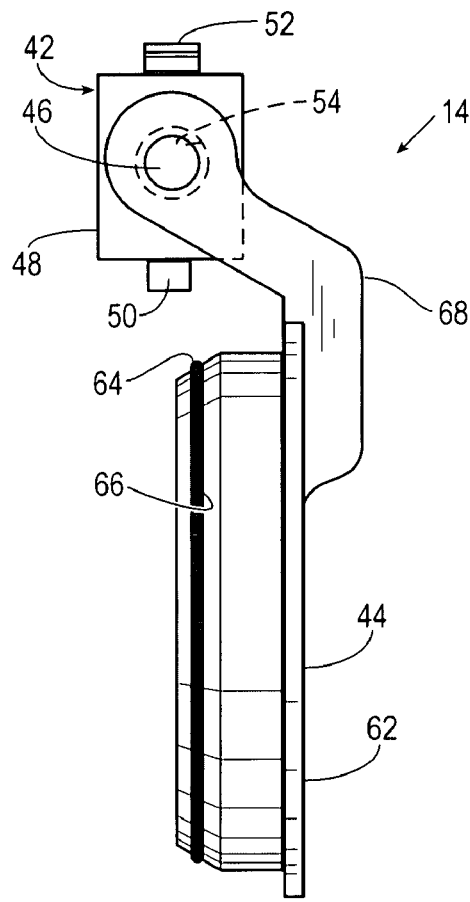
FIG. 3 is a side elevational view of a clapper assembly.
Figure 4:
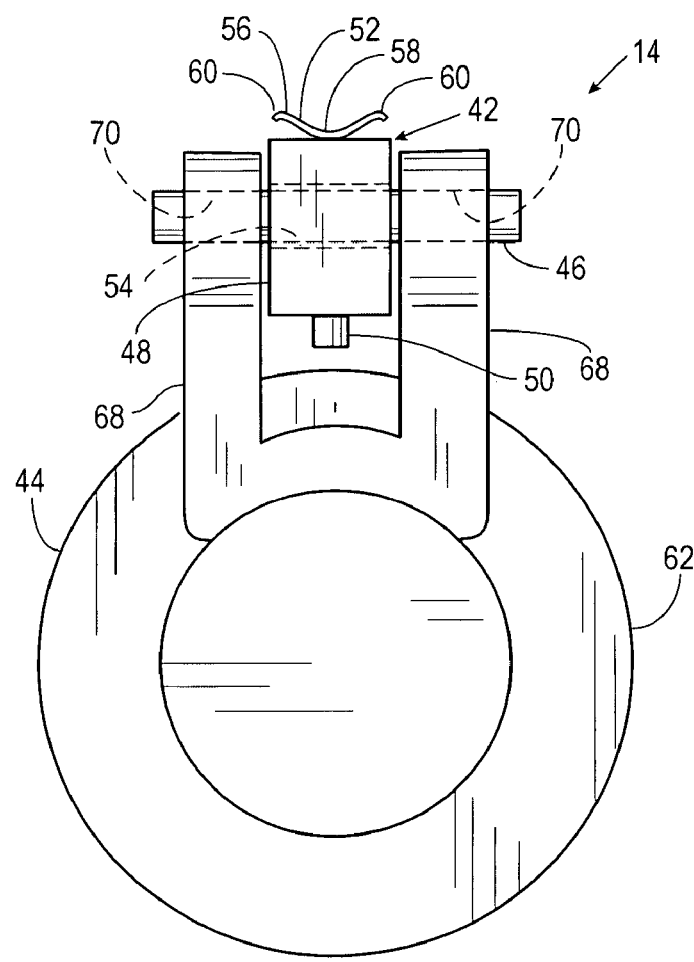
FIG. 4 is a rear elevational view of the clapper assembly of FIG. 3.

Referring now to FIGS. 1-4, the clapper assembly 14 includes a hanger 42 and a clapper 44 pivotally mounted to the hanger 42 with a pivot shaft 46. The hanger 42 is adapted to be firmly held between the bearing surface 28 of the valve body 12 and the abutment surface 40 of the closure member 16 and thereby support the clapper 44 in alignment with the inlet port 18. With reference to FIGS. 3-4, the hanger 42 includes a body member 48, an alignment pin 50 extending from one side of the body member 48, and a compressible member 52 connected to an opposing side of the body member 48.

The body member 48 is shown to be a generally cubicle member with a bore 54 extending therethrough from one side to an opposing side. However, it will be appreciated that the body member 48 may be formed of a variety of shapes so long as the body member 48 functions to pivotally support the clapper 44 and is securable between the bearing surface 28 of the valve body 12 and the abutment surface 40 of the closure member 16 in the manner to be described below. The alignment pin 50 extends from the body member 48 and is adapted to be matingly received in the pin receiving hole 30 of the valve body 12. The alignment pin 50 is positioned so that the clapper assembly 14 may be supported within the valve chamber 22 with the clapper 44 aligned with the inlet port 18 prior to the closure member 16 being secured to the valve body 12.

The compressible member 52 is connected to a side of the body member 48 opposite the alignment pin 50 such that the combination of the compressible member 52 and the body member 48 are capable of being held firmly between the bearing surface 28 of the valve body 12 and the abutment surface 40 of the closure member 16 when the closure member 16 is operably secured to the valve body 12. The function of the compressible member 52 is to cause the clapper assembly 14 to be held firmly in position between the valve chamber 22 and the closure member 16 while compensating for differences in dimension to the various components of the valve 10 due to normal manufacturing tolerances. For example, if a non-compressible body member were sized to be positioned alone between the closure member 16 and the valve body 12, in some instances the dimensions of the components of the valve 10 would result in the closure member 16 being properly sealed with the valve body 12 and the clapper assembly 14 being held in position without vibration or rubbing occurring between the clapper assembly 14 and the closure member 16 and/or the valve body 12.

However, in other instances when the dimensions of the components of the valve cause the distance between the bearing surface 28 of the valve body 12 and the abutment surface 40 of the closure member 16 to be decreased, the body member 48 would interfere with the closure member 16 being properly sealed to the valve body 12, thereby increasing the risk that the valve 10 would leak. On the other hand, if the dimensions of the components of the valve are such that the distance between the bearing surface 28 of the valve body 12 and the abutment surface 40 of the closure member 16 are increased, the height of the body member would be less than the distance from the bearing surface 28 to the abutment surface 40. As such, the closure member 16 would not engage the body member 48 before the closure member 16 is secured to the valve body 12. Consequently, the combined action of corrosion and the erosion created by vibration and the rubbing movement of the body member against the valve body 12 and the closure member 32 would rapidly cause a loss of surrounding metal which may result in failure of the valve 10 due to misalignment of the clapper 44.

The compressible member 52 is preferably some type of compression spring. The compressible member 52 is illustrated herein as being a "flat" spring formed from a strip material 56 to have a general U-shape with an intermediate portion 58 and two opposing end portions 60. The compressible member 52 is oriented in a substantially parallel relationship to the bore 54 of the body member 48 whereby the strip material 56 is tangentially positioned relative to the abutment surface 40 of the closure member 16. The end portions 60 of the strip material 56 are curved so that the end portions 60 of the strip material 58 curve away from the access port 32 to facilitate sliding engagement with the abutment surface 40 of the closure member 16. The compressible member 52 is connected to the body member 48 in a suitable fashion, such as with a pin, rivet or weld, or alternatively, the body member 48 and the compressible member 52 may be formed as a single piece.

The hanger 42, including the body member 48, the alignment pin 50, and the compressible member 52 are fabricated of a corrosion resistant material, such as stainless steel. The compressible member 52 is preferably resilient whereby the compressible member 52 is capable of recovering its shape after being deformed by the application of force caused by securing the closure member 16 to the valve body 12. However, it should be appreciated that the compressible member 52 may be formed of a material that becomes permanently deformed upon being compressed by the application of force so long as the compressible member 52 maintains sufficient tension against the abutment surface 40 so that the hanger 42 is held firmly between the closure member 16 and the valve body 12. It will also be appreciated that while the compressible member 52 has been described and illustrated as being engaged with the closure member 16, the compressible member 52 may alternatively be positioned on the body member 48 so that the compressible member 52 engages the valve body 12.

The clapper 44 is pivotally secured to the body member 48 with the pivot shaft 46 and cooperates with the valve seat 24 to provide alternate open and closed positions for the valve 10. The clapper 44 includes a substantially circular disc member 62 adapted to engage the valve seat 24 in the closed position of the valve 10. A suitable sealing member, such as an O-ring 64, is disposed in an annular groove 66 for engaging the valve seat 24 to preclude leakage of fluid in the closed position of the valve 10. Alternatively, the sealing member may be disposed in the valve seat 24 instead of on the disc member 62.

A pair of arms 68 extend from the disc member 62 in a spaced apart, parallel relationship. The arms 68 are spaced a sufficient distance to receive the body member 48 therebetween. The distal end of the arms 68 is provided with a bore 70 (FIG. 4) extending transversely therethrough for receiving the pivot shaft 46 therein. The pivot shaft 46 may be secured within the bores 70 of the arms 68 and the bore 54 of the body member 48 in any suitable manner, such as securing a fastener on the ends, forming a head on the ends of the pivot shaft 46 by enlarging or flattening the ends of the pivot shaft 46, or providing the pivot shaft 46 with a length where the ends of the pivot shaft 46 are positioned near the interior surface of the valve body 12. The distal end of the arms 68 are offset relative to the center of gravity of the disc member 62. As such, the pivot axis of the clapper assembly 14 is offset from the center of gravity of the disc member 62, thus causing the disc member 62 to be constantly urged in a direction toward the valve seat 24 in a normally closed position.

FIGS. 3 and 4 illustrate the bore 54 of the body member 48 being oversized relative to the pivot shaft 46 whereby the pivot shaft 46 is able to move laterally within the bore 54 to permit an amount of free play between the pivot shaft 46 and the body member 48. Such free play allows the clapper 44 to properly align with the valve seat 24 upon the clapper 44 moving to the closed position, thereby compensating for any potential misalignment of the clapper 44 with the valve seat 24 due to wear or manufacturing tolerances.

Figure 5:
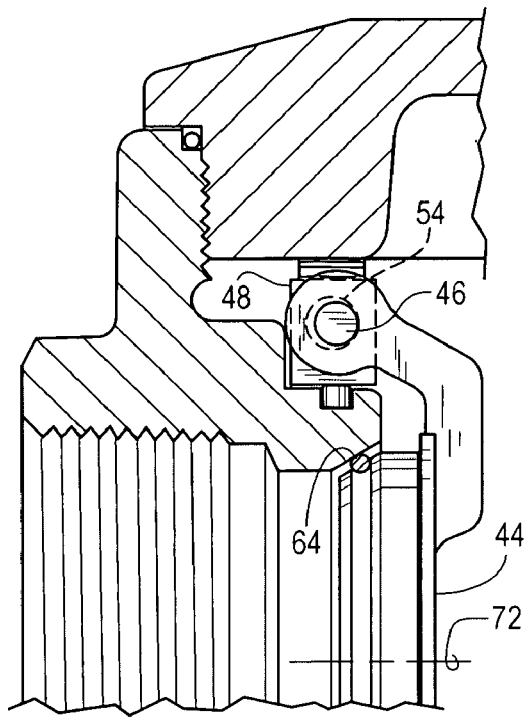
FIG. 5 is a side elevational view of a portion of the clapper assembly shown mounted to a valve body and in a low pressure condition.
Figure 6:
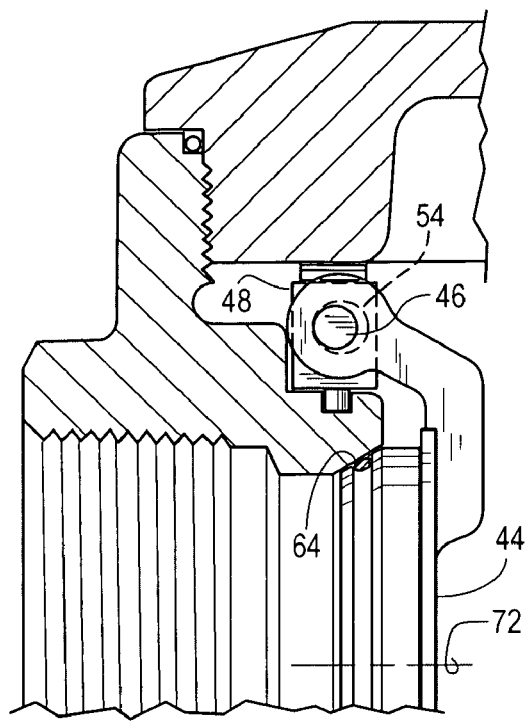
FIG. 6 is a side elevational view of a portion of the clapper assembly shown mounted to the valve body and in a high pressure condition.

As illustrated in FIGS. 5 and 6, the free play between the pivot shaft 46 and the body member 48 further permits the clapper 44 to move linearly along an axis 72 of the inlet port 18 in response to variances in line pressure. More specifically, the free play between the pivot shaft 46 and the body member 48 permits the clapper 44 to move along the axis 72 of the inlet port 18 whereby a uniform pressure is maintained on the seal member 64 in a low pressure condition (FIG. 5) and a high pressure condition (FIG. 6).

Figure 7:
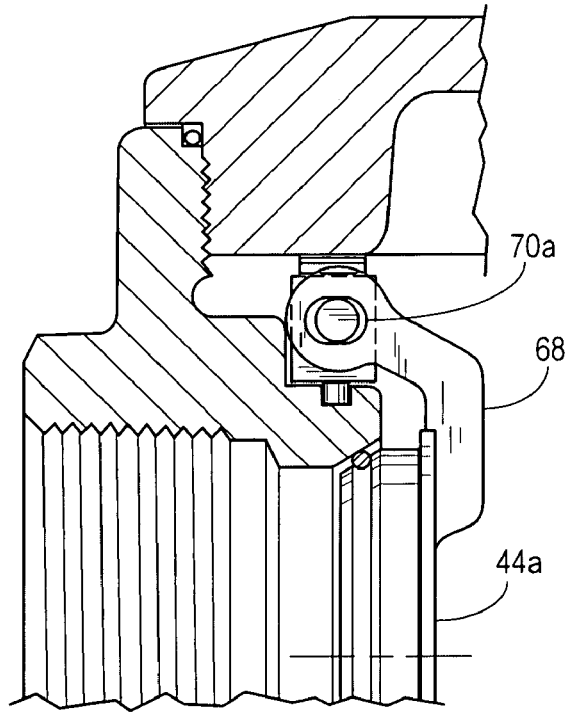
FIG. 7 is a side elevational view of a portion of another embodiment of a clapper assembly shown mounted to a body.

FIG. 7 illustrates another embodiment of a clapper 44a having arms 68a. Each arm 68a is provided with a bore 70a that is elongated wherein the elongated bores 70a allow axial movement of the clapper 44a in a manner similar to that described above to effect a uniform compression seal.

The above described construction of the valve 10 permits rapid repair of the valve 10 without requiring the valve body 12 being removed from the flow line. In particular, access to the clapper assembly 14 is obtained by unscrewing the closure member 16 from the valve body 12. With the closure member 16 removed from the valve body 12, the clapper assembly 14 can be grasped and withdrawn from the valve body 12 via the access port 32. A new clapper assembly 14 may then be inserted into the valve body 12 by inserting the alignment pin 50 in the pin receiving hole 30. The closure member 16 is then threaded onto the valve body 12 so that the abutment surface 40 of the closure member 16 engages and compresses the compressible member 52 of the hanger 42 and forces the body member 48 firmly against bearing surface 28 of the valve body 12.

Where fluid pressure is applied at the inlet port 18, such pressure bears against the disc member 62 of the clapper 44 to force the clapper 44 out of engagement with the valve seat 24 to provide a flow passage through the valve chamber 22 from the inlet port 18 to the outlet port 20 so that fluid will flow through the valve 10. When fluid pressure is applied at the outlet port 20, the weight of the clapper 44 cause the clapper 44 to pivot to the closed position wherein the disc member 62 engages the valve seat 24 to occlude the passage of fluid through the valve 10.

Figure 8:
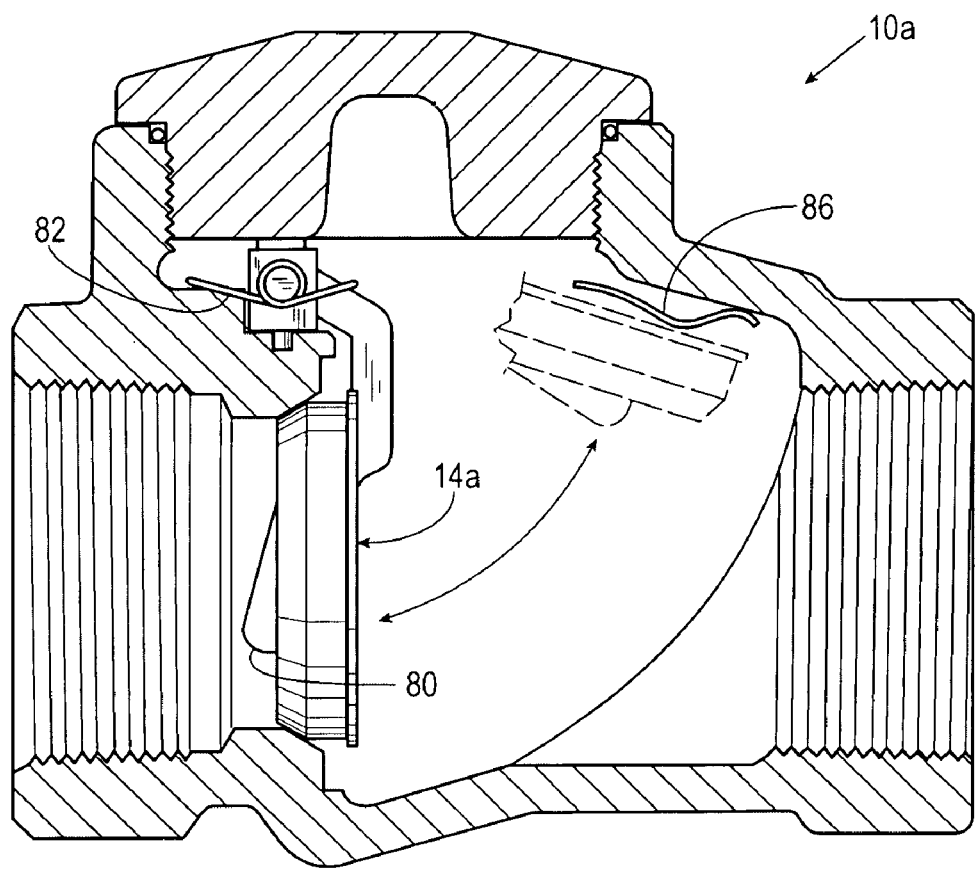
FIG. 8 is a sectional view of another embodiment of a check valve constructed in accordance with the present invention.
Figure 9:
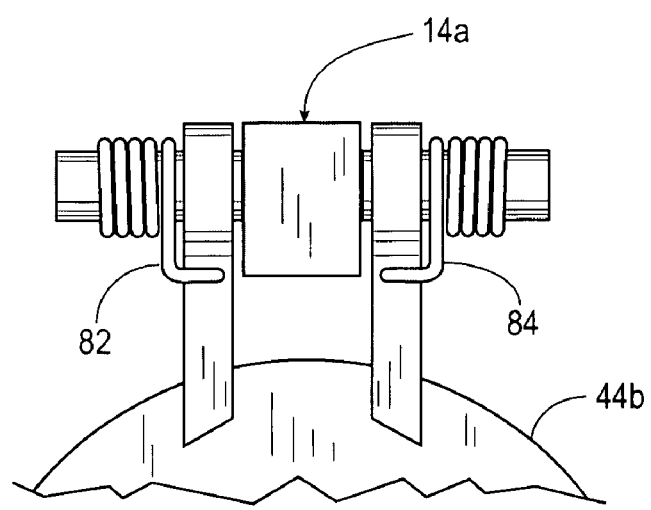
FIG. 9 is a rear elevational view of a portion of the clapper assembly of FIG. 8.

Referring now to FIGS. 8 and 9, a valve 10a constructed in accordance with the present invention is illustrated. The valve 10a is similar in construction to the valve 10 described above, with the exception the valve 10a is provided with a modified clapper assembly 14a. The clapper assembly 14a is similar to the clapper assembly 14 described above, but the clapper assembly 14a is provided with features that may enhance the performance of the clapper assembly 14a over that of the clapper assembly 14. First, the clapper assembly 14a is provided with a counterweight 80 on a clapper 44b to facilitate movement to the closed position in both horizontal and vertical service. The clapper 44b is further shown to have a pair of return springs 82 and 84 (FIGS. 8 and 9) to further facilitate rapid closure of the clapper 44b by biasing the clapper 44b in the closed position. The return springs 82 and 84 also reduce slamming of the clapper 44b caused by pressure reversal. Finally, the valve 10a is shown to be provided with a cushion spring 86 positioned to receive the clapper 44b and thus absorb the impact of the clapper 44b upon rapid opening of the clapper 44b.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

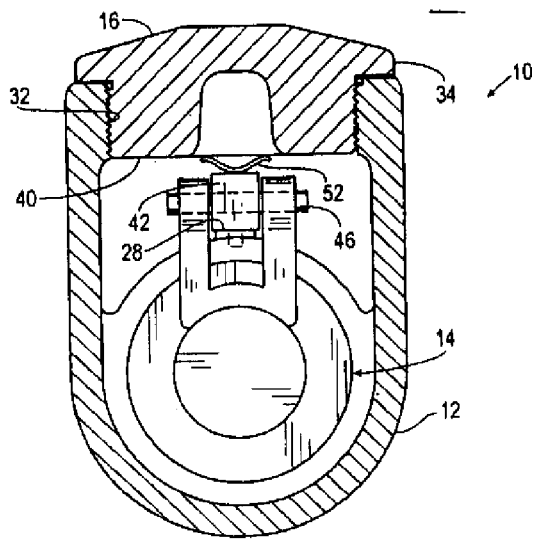

What is claimed is:

1. A valve, comprising:
   a valve body having an inlet port, an outlet port, a flow passage extending between the inlet port and the outlet port, and an access port;
   a valve seat defined about the inlet port of the valve body;
   a compressible hanger supported by the valve body;
   a clapper supported by the hanger so that the clapper is movable between a closed position wherein the clapper engages the valve seat to occlude the passage of fluid through the fluid flow passage and an open position wherein the clapper is moved away from the valve seat to permit passage of fluid through the fluid flow passage; and
   a closure member connected to the valve body to close the access port of the valve body, the closure member having an abutment surface in contact with the hanger so that the hanger is compressed between the closure member and the valve body.

2. The valve of claim 1 wherein the hanger comprises a body member and a compressible member extending from one side of the body member, the compressible member being compressed upon the closure member being operably connected to the valve member.

3. The valve of claim 2 wherein the compressible member is resilient.

4. The valve of claim 2 wherein the compressible member is positioned between the body member and the closure member.

5. The valve of claim 2 wherein the compressible member is a substantially U-shaped strip material having opposing ends and a medial portion, the medial portion being connected to the body member.

6. The valve of claim 5 wherein the closure member is threadingly connected to the valve member, and wherein the opposing ends of the strip material curve away from the abutment surface of the closure member to facilitate sliding engagement between the abutment surface of the closure member and the ends of the strip material as the closure member is being threadingly connected to the valve body.

7. The valve of claim 5 wherein the closure member is threadingly connected to the valve member, wherein the strip material is oriented on the body member such that a longitudinal axis of the strip material is tangentially positioned relative to the abutment surface of the closure member, and wherein the opposing ends of the strip material curve away from the abutment surface of the closure member to facilitate sliding engagement between the abutment surface of the closure member and the ends of the strip material as the closure member is being threadingly connected to the valve body.

8. The valve of claim 1 wherein the hanger has an alignment pin extending from one side thereof and wherein the valve body is provided with a pin receiving hole for receiving the alignment pin of the hanger to support the hanger on the valve body prior to the closure member being connected to the valve body.

9. The valve of claim 1 wherein the clapper is movable along a longitudinal axis of the inlet port.

10. The valve of claim 9 wherein the hanger has a bore extending therethrough and wherein the clapper is connected to the hanger with a pivot shaft extending through the bore, the bore being sized to permit lateral movement of the pivot shaft in the bore.

11. The valve of claim 9 wherein the hanger has a bore extending therethrough and wherein the clapper is connected to the hanger with a pivot shaft extending through the bore, the clapper having a pair of arms provided with bores for receiving the pivot shaft, the bores of the arms being elongated to permit lateral movement of the clapper relative to the pivot shaft.

12. The valve of claim 1 wherein the clapper is provided with a counterweight.

13. The valve of claim 1 wherein the valve body is provided with a cushion spring positioned to engage the clapper when the clapper is in a full open position.

14. The valve of claim 1 wherein the clapper further comprises means for biasing the clapper in the closed position.

15. A valve, comprising:
   a valve body having an inlet port, an outlet port, a flow passage extending between the inlet port and the outlet port, and an access port;
   a valve seat defined about the inlet port of the valve body;
   a spring positioned between the valve body and the access port of the valve body;
   a clapper connected to the spring so that the clapper is movable between a closed position wherein the clapper engages the valve seat to occlude the passage of fluid through the fluid flow passage and an open position wherein the clapper is moved away from the valve seat to permit passage of fluid through the fluid flow passage; and
   a closure member removably connected to the valve body to selectively close and open the access port of the valve body, the closure member having an abutment surface in contact with the spring so as to compress the spring between the closure member and the valve body.

16. The valve of claim 15 wherein the spring is resilient.

17. The valve of claim 15 wherein the clapper is movable along a longitudinal axis of the inlet port.

18. The valve of claim 15 wherein the clapper is provided with a counterweight.

19. The valve of claim 15 wherein the valve body is provided with a cushion spring positioned to engage the clapper when the clapper is in a full open position.

20. The valve of claim 15 wherein the clapper further comprises means for biasing the clapper in the closed position.

* * * * *

UNITED STATES PATENT AND TRADEMARK OFFICE
CERTIFICATE OF CORRECTION

PATENT NO. : 7,249,611 B2  
APPLICATION NO. : 11/595584  
DATED : July 31, 2007  
INVENTOR(S) : Scaramucci et al.

Page 1 of 2

It is certified that error appears in the above-identified patent and that said Letters Patent is hereby corrected as shown below:

The title page, showing an illustrative figure, should be deleted and substitute therefor the attached title page.

In the Drawings:  
Insert FIG. 1

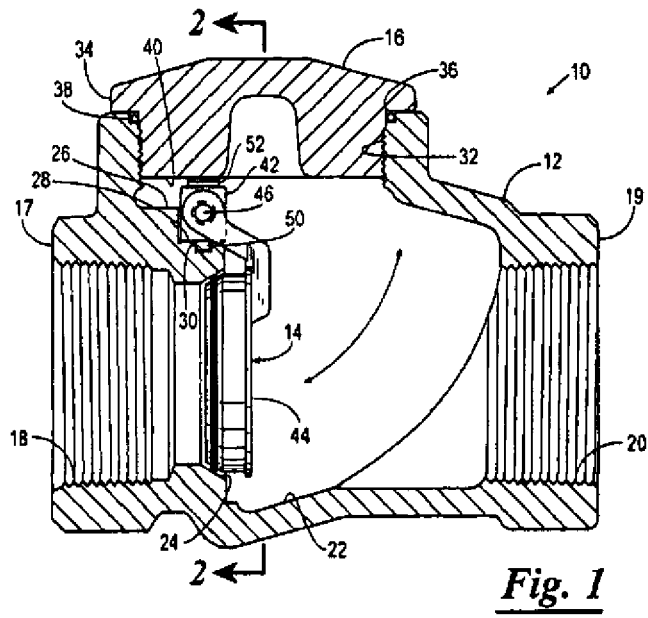

*Fig. 1*

Signed and Sealed this

Fifteenth Day of September, 2009

David J. Kappos  
*Director of the United States Patent and Trademark Office*

(12) United States Patent
Scaramucci et al.

(10) Patent No.: US 7,249,611 B2
(45) Date of Patent: *Jul. 31, 2007

(54) CHECK VALVE

(75) Inventors: John P. Scaramucci, Oklahoma City, OK (US); Danny Ray Lowe, Moore, OK (US)

(73) Assignee: Valve Innovations, L.L.C., Carson City, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/595,584

(22) Filed: Nov. 9, 2006

(65) Prior Publication Data
US 2007/0051411 A1 Mar. 8, 2007

Related U.S. Application Data

(63) Continuation of application No. 10/990,071, filed on Nov. 16, 2004, now Pat. No. 7,152,622.

(51) Int. Cl.
F16K 15/03 (2006.01)

(52) U.S. Cl. ............... 137/527.2; 137/514; 137/527.4; 137/527.8; 137/904

(58) Field of Classification Search ............... 137/514, 137/527, 527.2, 527.4, 527.8, 904
See application file for complete search history.

(56) References Cited

U.S. PATENT DOCUMENTS

| 79,527 | A | * | 6/1868 | Wilson | 137/527.2 |
| 197,226 | A | * | 11/1877 | Rodier | 137/527.2 |
| 345,420 | A | * | 7/1886 | Eskholme | 137/527.2 |
| 556,636 | A | * | 3/1896 | Kuichling et al. | 137/527.2 |
| 2,454,072 | A | * | 11/1948 | Long | 137/527.8 |
| 2,928,416 | A | * | 3/1960 | Balhouse | 137/527.8 |
| 3,075,547 | A | * | 1/1963 | Scaramucci | 137/527.2 |
| 5,056,548 | A | * | 10/1991 | Mills | 137/527.2 |
| 5,156,183 | A | * | 10/1992 | Scaramucci | 137/454.2 |
| 5,341,840 | A | * | 8/1994 | Manson et al. | 137/527.8 |
| 7,152,622 | B2 | * | 12/2006 | Scaramucci et al. | 137/527.2 |

* cited by examiner

*Primary Examiner*—John Rivell
(74) *Attorney, Agent, or Firm*—Dunlap Codding & Rogers, P.C.

(57) ABSTRACT

A top entry check valve including a valve body with an access port. A compressible hanger body engages a portion of the valve body and is positioned in alignment with the access port of the valve body. A clapper is connected to the hanger body so that the clapper is movable between a closed position wherein the clapper engages a valve seat to occlude the passage of fluid through the fluid flow passage and an open position wherein the clapper is moved away from the valve seat to permit passage of fluid through the fluid flow passage. A closure member is connected to the valve body to close the access port of the valve body. The closure member has an abutment surface engaging the hanger body so that the hanger body is compressed between the closure member and the valve body.

20 Claims, 4 Drawing Sheets